US011214355B2

(12) United States Patent
Schlipf et al.

(10) Patent No.: US 11,214,355 B2
(45) Date of Patent: Jan. 4, 2022

(54) WING FOR AN AIRCRAFT

(71) Applicant: AIRBUS OPERATIONS GMBH, Hamburg (DE)

(72) Inventors: Bernhard Schlipf, Hamburg (DE); Florian Lorenz, Hamburg (DE); Dennis Krey, Hamburg (DE); Stefan Bensmann, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 0 days.

(21) Appl. No.: 16/967,553

(22) PCT Filed: Jan. 30, 2019

(86) PCT No.: PCT/EP2019/052294
§ 371 (c)(1),
(2) Date: Aug. 5, 2020

(87) PCT Pub. No.: WO2019/154698
PCT Pub. Date: Aug. 15, 2019

(65) Prior Publication Data
US 2021/0163121 A1 Jun. 3, 2021

(30) Foreign Application Priority Data

Feb. 6, 2018 (DE) .................. 10 2018 102 654.4

(51) Int. Cl.
*B64C 9/24* (2006.01)
*B64C 3/50* (2006.01)

(52) U.S. Cl.
CPC . *B64C 9/24* (2013.01); *B64C 3/50* (2013.01)

(58) Field of Classification Search
CPC .......... Y02T 50/40; Y02T 50/30; B64C 9/02; B64C 3/50; B64C 9/00; B64C 9/24
See application file for complete search history.

(56) References Cited

U.S. PATENT DOCUMENTS

| | | | | |
|---|---|---|---|---|
| 4,650,140 A | * | 3/1987 | Cole | B64C 9/24 244/214 |
| 4,753,402 A | * | 6/1988 | Cole | B64C 9/22 244/210 |

(Continued)

FOREIGN PATENT DOCUMENTS

| | | |
|---|---|---|
| EP | 0 230 681 | 8/1987 |
| GB | 404149 * | 1/1934 |

OTHER PUBLICATIONS

International Search Report and Written Opinion of the ISA for PCT/EP2019/052294 dated May 7, 2019, 12 pages.

*Primary Examiner* — Assres H Woldemaryam
(74) *Attorney, Agent, or Firm* — Nixon & Vanderhye P.C.

(57) ABSTRACT

A wing for an aircraft is disclosed having a main wing, a slat, and a connection assembly movable connecting the slat to the main wing. The connection assembly includes an elongate slat track, and the front end of the slat track is mounted to the slat. The rear end and the intermediate portion of the slat track are mounted to the main wing by a roller bearing that includes a guide rail mounted to the main wing and a first roller unit mounted to the rear end of the slat track and engaging the guide rail, and wherein the roller bearing having a second roller unit that is mounted to the main wing and that engages an engagement surface of the slat track. The slat track is supported in a wing span direction by a lateral support.

15 Claims, 5 Drawing Sheets

(56) References Cited

U.S. PATENT DOCUMENTS

Figure 1:
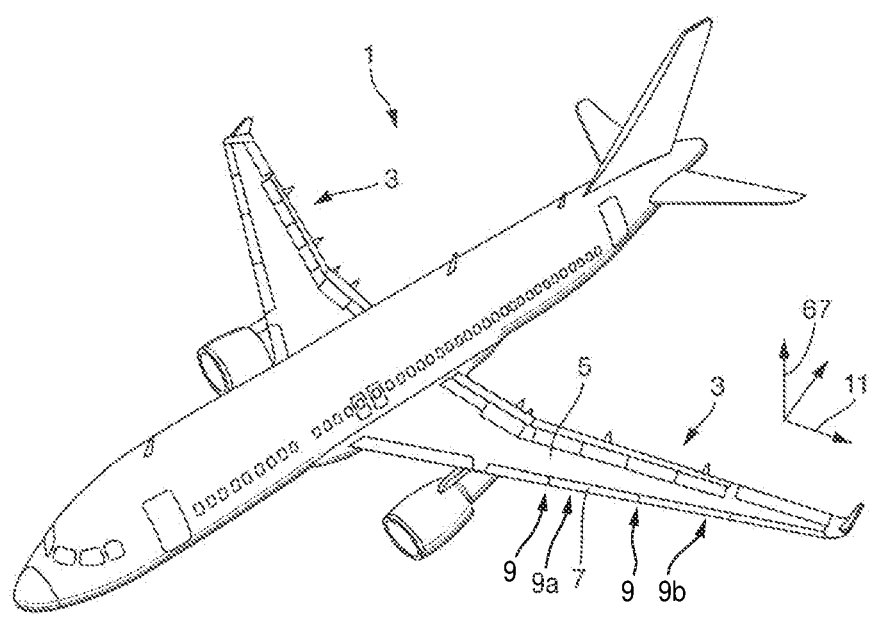

| | | | | |
|---|---|---|---|---|
| 6,149,105 | A * | 11/2000 | Jaggard | B64C 9/28 244/214 |
| 10,053,237 | B2 * | 8/2018 | Huang | B64D 45/0005 |
| 10,179,641 | B2 * | 1/2019 | Brakes | B64C 9/22 |
| 10,822,072 | B2 * | 11/2020 | Schlipf | B64C 9/24 |
| 10,919,616 | B2 * | 2/2021 | Vervliet | B64C 9/22 |
| 2009/0127402 | A1 * | 5/2009 | Jaggard | B64C 9/24 244/213 |
| 2011/0168849 | A1 * | 7/2011 | Parker | B64C 9/02 244/214 |
| 2014/0061381 | A1 * | 3/2014 | Gyuricsko | B64C 9/02 244/99.3 |
| 2014/0131512 | A1 * | 5/2014 | Gyuricsko | F16C 41/002 244/99.3 |
| 2018/0086432 | A1 * | 3/2018 | Schlipf | B64C 13/28 |

\* cited by examiner

WING FOR AN AIRCRAFT

CROSS REFERENCE TO RELATED APPLICATIONS

The present application is a National Phase of International Application Number PCT/EP2019/052294 filed Jan. 30, 2019, which designated the U.S. and claims priority benefits from German Patent Application No. DE 10 2018 102 654.4 filed Feb. 6, 2018, the entire contents of each of which are hereby incorporated by reference.

The present invention relates to a wing for an aircraft, comprising a main wing, a slat, and a connection assembly movable connecting the slat to the main wing, such that the slat is movable between a retracted position and at least one extended position. Further aspects of the invention relate to an aircraft comprising such a wing and to a connection assembly as used in such a wing.

The connection assembly comprises an elongate slat track that extends along a track longitudinal axis between a front end and a rear end and has an intermediate portion between the front and rear ends. The front end of the slat track is preferably fixedly mounted to the slat, e.g. by two spherical bearings, both arranged with an offset in a wing profile plane across a wing span direction. The rear end and the intermediate portion of the slat track are movably mounted to the main wing by a roller bearing such that the slat track is movable along the track longitudinal axis, i.e. along a predefined path, preferably a circular path.

The roller bearing comprises a guide rail fixedly mounted to the main wing and a first roller unit mounted to the rear end of the slat track and engaging the guide rail. Preferably, the guide rail is formed, e.g. by a c-shape or by separate upper and lower parts, such that its surfaces lie opposite the circumferential surface of the first roller unit, wherein the distance between an upper surface and a lower surface of the guide rail is larger than a diameter of the first roller unit, so that the first roller unit may engage only either the upper surface or the lower surface of the guide rail at the same time. I.e., the distance between upper and lower surfaces of the guide rail is selected such that a clearance is provided between the first roller unit and either the upper surface or the lower surface of the guide rail, so that the first roller unit cannot engage with the upper and lower surfaces of the guide rail at the same time and thereby block the first roller unit. However, the first roller unit might also include two or more roller elements, wherein one roller element contacts the upper surface and another roller element contacts the lower surface of the guide rail. Further preferably, the first roller unit has a first axis of rotation extending in parallel to a wing span direction, to a leading edge of main wing, or to a leading edge of the slat.

The roller bearing comprises a second roller unit that is fixedly mounted to the main wing and that engages an engagement surface provided at the intermediate portion of the slat track. Preferably, the second roller unit has a second axis of rotation extending in parallel to the wing span direction, to the leading edge of main wing, or to the leading edge of the slat.

Besides the roller bearing, the slat track is supported in a wing span direction by a lateral support restricting movement of the slat track in the wing span direction when the slat track is moved along the track longitudinal axis. Instead of the wing span direction the present invention might also refer to a direction parallel to a leading edge of the main wing, or to a direction parallel to a leading edge of the slat, so that these directions might be exchanged without deviating from the invention. The term "lateral" within the meaning of the invention refers to the wing span direction.

Such wings are known in the art, for example from GB 404,149, where the connections assembly comprises a second roller unit composed of two roller elements engaging the slat track on opposite upper and lower surfaces. Also, it is known that the lateral support of the slat track is formed by rollers engaging lateral surfaces of the slat track with their circumferential roller surfaces. However, there is a constant need in the art to reduce size, weight and complexity of the connection assembly and, thus, of the entire wing.

Therefore, the object of the present invention is to provide a possibly simple, lightweight and cost-efficient wing design.

This object is achieved in that the lateral support includes or is formed as a slide bearing comprising at least a first pair of slide pads and a second pair of slide pads, each pair of slide pads supporting the slat track on opposite lateral sides. The first pair of slide pads is fixedly mounted to the main wing, specifically to ribs of the main wing, and comprises a first inner slide pad and a first outer slide pad, wherein the first inner and outer slide pads engage corresponding first slide surfaces on opposite lateral sides of the slat track, so that the first slide surfaces slide along the slide pads of the first pair during movement of the slat track along the track longitudinal axis. The second pair of slide pads comprises a second inner slide pad and a second outer slide pad that are fixedly mounted to opposite lateral sides of the slat track in a position spaced apart from the first pair of slide pads along the track longitudinal axis.

The term "spaced apart" in this connection includes that the first and second pairs of slide pads might be positioned adjacent to one another or even overlap in certain positions of the slat track, as long as their positions along the track longitudinal axis is not fully aligned. The second inner and outer slide pads are mounted to the opposite lateral sides of the slat track in such a manner that the second inner and outer slide pads engage corresponding second slide surfaces on opposite lateral sides of the guide rail or of the main wing, in particular ribs of the main wing.

By using such a slide bearing as the lateral support, the number of rollers required can be significantly reduced, thereby reducing complexity, weight and costs of the wing.

The slide pads of the second pair might be formed as separate elements that are fixedly attached to the slat track, or might be formed integrally with the slat track. Slide pads within the meaning of the present invention relate to structural elements, e.g. in the form of a block or a strip, having a defined contact surface configured for low friction to support sliding relative to another surface that contacts the said contact surface. The other surface that contacts the contact surface of the slide pads does not necessarily need to be configured for sliding or low friction. Preferably, the contact surface has an even form, but might also be slightly curved, e.g. in a convex form. Preferably, the contact surface is coated with a low friction coating, e.g. made of plastic or teflon. Alternatively, a plurality of distinct elements of solid lubricant material are distributed over the contact surface, preferably formed as inserts inserted in or attached to the slide pads at the contact surface.

According to one alternative solution, the second pair of slide pads could be exchanged with a tongue and groove support, where a tongue, e.g. in the form of a pin, runs in a linear groove that is in parallel with the track longitudinal axis to limit movement of the slat track in the wing span direction and allow movement of the slat track along the track longitudinal axis. Thus, in other words, such a tongue and groove support may be provided instead of the second pair of slide pads. In this alternative solution the tongue is preferably provided on the slat track, preferably extending downwards from a lower surface of the slat track, and engages the groove formed in the guide rail. However, the tongue might also be provided on the guide rail and engaging the groove formed in the slat track. This alternative solution might be combined with the embodiments described herein in connection with the second pair of slide pads, i.e. in any of the embodiments described herein in connection with the second pair of slide pads the tongue and groove support as described above may be provided instead of the second pair of slide pads. The tongue and groove support as described before might also be provided additionally to the second pair of slide pads, so that it forms an embodiment of the present invention.

According to another alternative solution, the second pair of slide pads could be exchanged with a pair of rollers that is mounted to opposite lateral sides of the slat track. Specifically, one roller could be mounted to a first lateral side and another roller could be mounted to the opposite second lateral side of the slat track. Thus, in other words, such a pair of rollers may be provided instead of the second pair of slide pads. This alternative solution might be combined with the embodiments described herein in connection with the second pair of slide pads, i.e. in any of the embodiments described herein in connection with the second pair of slide pads the pair of rollers as described above may be provided instead of the second pair of slide pads.

According to yet another alternative solution, the first pair of slide pads could be omitted in cases where the functionality of the first pair of slide pads, i.e. lateral support near the front end of the slat track, could be taken over by the second roller unit. This alternative solution might be combined with the embodiments described herein where the first pair of slide pads is present, i.e. in any of the embodiments described herein in connection with the first pair of slide pads, this first pair of slide pads might also be omitted.

According to a preferred embodiment, the slat track has a profile, i.e. a cross section across the longitudinal axis, comprising an upper flange portion, a lower flange portion and at least one web portion connecting upper and lower flange portions. Such a profile might be e.g. a C-profile, a double-C-profile, an I-profile, an H-profile, or a Π-profile.

In particular, it is preferred that the first slide surface is provided on opposite lateral surfaces of the lower flange portion. These positions are easily accessible for the slide pads and allow efficient supporting. Preferably, shim plates of specific thickness inserted between the slide pads of the first pair and corresponding ribs of the main wing they are mounted to might be used to adjust the distance between the slide pads and the first slide surface in order to minimize play.

According to a further preferred embodiment, the first pair of slide pads forms a stopper that may be contacted by the second pair of slide pads or by a corresponding projection at the slat track to limit movement of the slat track along the track longitudinal axis. In such a way, the first pair of slide pads has a double function.

According to yet a further preferred embodiment, the second pair of slide pads is mounted to opposite lateral surfaces of the lower flange portion, to opposite lateral surfaces of the upper flange portion, to opposite lateral surfaces of the web portion, or to opposite lateral surfaces of cover parts of the rear end. Those positions are easily accessible and allow efficient supporting.

According to yet a further preferred embodiment, the slide bearing comprises a third pair of slide pads that comprises a third inner slide pad and a third outer slide pad that are mounted to opposite lateral sides of the slat track in a position spaced apart from the second pair of slide pads in a track thickness direction, i.e. perpendicular to the track longitudinal axis and to the wing span direction. The third inner and outer slide pads are mounted to the opposite lateral sides of the slat track in such a manner that the third pair of slide pads engages corresponding third slide surfaces on opposite lateral sides of the guide rail or the main wing, in particular ribs of the main wing. The slide pads of the third pair might be formed as separate elements that are fixedly attached to the slat track, or might be formed integrally with the slat track. Such a third pair of slide pads ensures that the slat track cannot tilt or twist about the track longitudinal axis.

In particular, it is preferred that the third pair of slide pads is mounted to opposite lateral surfaces of the lower flange portion, to opposite lateral surfaces of the upper flange portion, to opposite lateral surfaces of the web portion, or to opposite lateral surfaces of cover parts of the rear end. Those positions are easily accessible and allow efficient supporting.

According to another preferred embodiment, the second roller unit is arranged in a recess between upper and lower flange portions and engages the engagement surface provided at the upper flange portion and/or at the lower flange portion, preferably either the upper flange portion or the lower flange portion or both flange portions in a successive manner. In such a way, the second roller unit does not occupy the space above and below the slat track, and the slat track can be held with only a single roller element. This simplifies the connection assembly, saves space and weight, and thus increases efficiency of the wing. Further, the connection assembly can be formed such that it is arranged entirely in front of the front spar of the associated wing and does not penetrate the front spar.

In particular, it is preferred that the slat track has such a profile, in particular an I-profile or double-C-profile, that a first recess is formed between the upper and lower flange portions at a first side of the web portion, and a second recess is formed between the upper and lower flange portions at a second side of the web portion opposite the first side. In such a way, two roller elements can be received in both recesses.

It is also preferred that the second roller unit comprises a first roller element and a second roller element. The first roller element is arranged in the first recess and the second roller element is arranged in the second recess. First and second roller elements are arranged coaxially, i.e. both rotating about the second axis of rotation, and have the same radius. By the first and second roller element higher loads can be absorbed and a symmetric arrangement or an arrangement with two separate load paths is enabled.

Further, it is preferred that the web portion of the slat track comprises a slot extending from the first side to the second side of the web portion and extending elongated along the track longitudinal axis. Preferably, the slot extends along the track longitudinal axis at least as long as the distance by which the slat is moved between the retracted and a fully extended position. The first roller element and the second roller element are mounted on one common shaft for common rotation. The common shaft proceeds through the slot from the first side to the second side of the web portion. Preferably, opposite ends of the common shaft are supported at the main wing. By using one common shaft to support first and second roller elements bending loads introduced in the main wing structure are minimized.

According to an alternative embodiment, the first roller element is mounted on a first shaft and the second roller element is mounted on a second shaft separate from the first shaft. Preferably, first and second shafts are independently supported at the main wing. By using separate shafts to support first and second roller elements no slot through the slat track is required.

According to a preferred embodiment, the first roller unit comprises a single third roller element, preferably mounted to the slat track by a yoke-shaped rear end of the slat track that holds the third roller element from opposite sides. Using only a single third roller element represents a very simple design. Preferably, the third roller element is supported by a shaft that is rotatably mounted to a first yoke arm at one side of the third roller element and to a second yoke arm at the opposite other side of the third roller element. Preferably, the opposite lateral sides of the first and second yoke arms are covered by first and second cover parts. The cover parts protect the shaft that project through the yoke arms. Preferably, the second pair of slide pads and/or the third pair of slide pads are mounted to the opposite lateral surfaces of the cover parts. The cover parts are an advantageous location for the slide pads as they might provide a large even surface and are easily exchangeable.

In particular, it is preferred that shim plates of specific thickness are inserted between the first cover part and the first yoke arm and/or between the second cover part and the second yoke arm, to adjust the distance between the second pair of slide pads and the second slide surface and/or between the third pair of slide pads and the third slide surface. By such shim plates, play can be minimized between the first or second pair of slide pads on the first and second cover parts, and the corresponding second or third slide surfaces.

In an alternative embodiment, the first roller unit comprises a third roller element and a fourth roller element. Third and fourth roller elements are arranged coaxially, i.e. both rotating about the first axis of rotation, and have the same radius. Preferably, the third roller element is arranged at the first side and the fourth roller element is arranged at the second side of the web portion. In such a way, a backup roller element is provided.

In particular, it is preferred that the first roller unit comprises a fifth roller element and a sixth roller element. The fifth and sixth roller elements are arranged coaxially and have the same radius. The fifth and sixth roller elements are mounted to the slat track parallel spaced apart with respect to their axes of rotation from the third and fourth roller elements, such that the third and fourth roller elements engage with the engagement surface at the lower flange portion and the fifth and sixth roller elements engage with the engagement surface at the upper flange portion. In such a way, play between the rollers and the guide rail can be avoided.

According to a preferred embodiment, the slat track comprises a first track part and a second track part that are formed separate from one another. Each of the first and second track parts is formed integrally and extends along the track longitudinal axis from the rear end to the front end. The first and second track parts are mounted to one another, e.g. by bolts, and rest against one another along a contact plane spanned by the track longitudinal axis and a wing thickness direction, which might be a vertical symmetry plane, preferably along the entire longitudinal extension. By the first and second track part two separate load paths are introduced which might be designed as redundant load paths such that when one load path fails the other load path is still capable of carrying the occurring air loads applied via the slat.

In particular, in case of only one third roller element, it is preferred that the third roller element is mounted to both the first track part and the second track part. In such a way, in case of failure of one of the first and second track parts the third roller element would still be sufficiently supported by the other one of the first and second track parts, so that this track part would still be guided by the third roller element.

Alternatively, in the case that a third roller element and a fourth roller element are provided, it is preferred that the third roller element is mounted to the first track part and the fourth roller element is mounted to the second track part. In such a way, in case of failure of one of the first and second track portions the other one of the first and second track portions would still be guided by the associated one of the third and fourth rollers.

According to a preferred embodiment, the distance between the upper flange portion and the lower flange portion of the slat track is larger than a diameter of the second roller unit, such that a clearance is provided either between the second roller unit and the engagement surface at the upper flange portion, or between the second roller unit and the engagement surface at the lower flange portion. Specifically, the clearance is smaller, preferably down to a minimum, at gated locations along the slat track where the second roller unit is located when the slat is in the retracted position and/or in a fully extended position and/or in a defined partly extended position, e.g. take-off position. At the same time, the clearance is larger in areas between the gated locations. Such gated locations with minimum clearance simplify control of the slat movement between the retracted and extended positions.

According to a further preferred embodiment, the roller bearing comprises a third roller unit mounted to the main wing and engaging an upper surface of the upper flange portion of the slat track. Preferably, the third roller unit comprises one common roller element engaging both first and second track parts. Further preferably, the third roller element rotates about a third axis of rotation in parallel to the wing span direction. Further preferably, the third roller unit is arranged proximate the leading edge of the main wing and might be arranged inside the main wing, partly outside the main wing or fully outside the main wing with respect to an outer skin profile line of the main wing. By such a third roller unit additional support of the slat against the air loads is obtained.

According to yet a further preferred embodiment, the connection assembly is a first connection assembly. The wing comprises a second connection assembly connecting the slat to the main wing in a position spaces apart from the first connection assembly in a wing span direction. The second connection assembly is formed as the first connection assembly, i.e. has the same features as the first connection assembly. Alternatively, the second connections assembly might also be formed different from the first connection assembly.

A further aspect of the present invention relates to an aircraft comprising a wing according to any of the aforedescribed embodiments. The features and advantages mentioned in connection with the wing also apply for the aircraft.

Yet a further aspect of the present invention relates to a connection assembly for movably connecting a slat to a main wing for an aircraft, as described above in connection with the wing. The connection assembly comprises an elongate slat track that extends along a track longitudinal axis between a front end and a rear end and has an intermediate portion between the front and rear ends. The front end of the slat track is configured to be mounted to the slat. The rear end and the intermediate portion of the slat track are configured to be mounted to the main wing by a roller bearing such that the slat track is movable along the track longitudinal axis. The roller bearing comprises a guide rail configured to be mounted to the main wing, and a first roller unit mounted to the rear end of the slat track and configured for engaging the guide rail. The roller bearing comprises a second roller unit that is configured to be mounted to the main wing and that is configured for engaging an engagement surface provided at the intermediate portion of the slat track. The slat track is configured to be supported in a wing span direction by a lateral support. The lateral support includes a slide bearing comprising at least a first pair of slide pads and a second pair of slide pads. The first pair of slide pads is configured to be mounted to the main wing and configured to engage corresponding first slide surfaces on opposite lateral sides of the slat track. The second pair of slide pads is configured to be mounted to opposite lateral sides of the slat track in a position spaced apart from the first pair of slide pads along the track longitudinal axis, such that the second pair of slide pads is configured to engage corresponding second slide surfaces on opposite lateral sides of the guide rail or the main wing. The features and advantages mentioned in connection with the wing apply vis-à-vis in case of the connection assembly.

Hereinafter, preferred embodiments of the present invention are explained in more detail by means of a drawing. The drawing shows in FIG. 1 a perspective view of an aircraft according to the present invention, including a wing with several connection assemblies, FIG. 2 a side view of a first embodiment of a connection assembly as used in the wing shown in FIG. 1, FIG. 3 a perspective detailed view of the rear end of the connection assembly shown in

Figure 2:
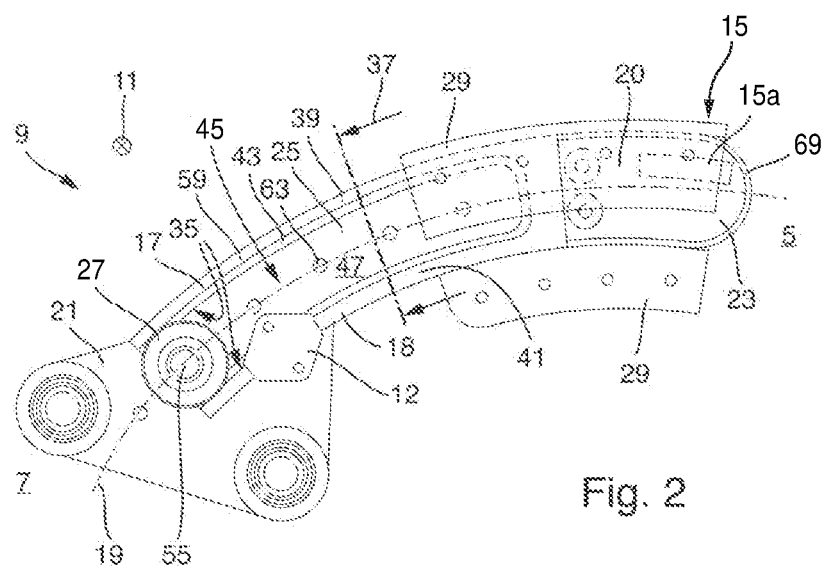
Figure 4:
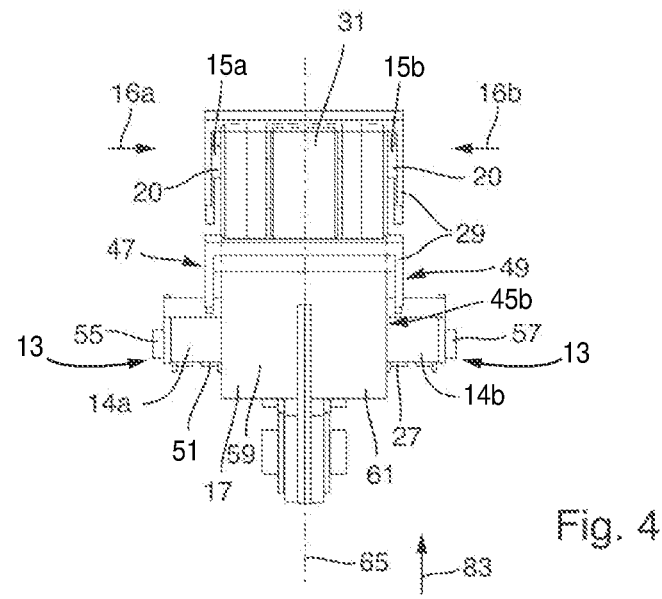
Figure 5:
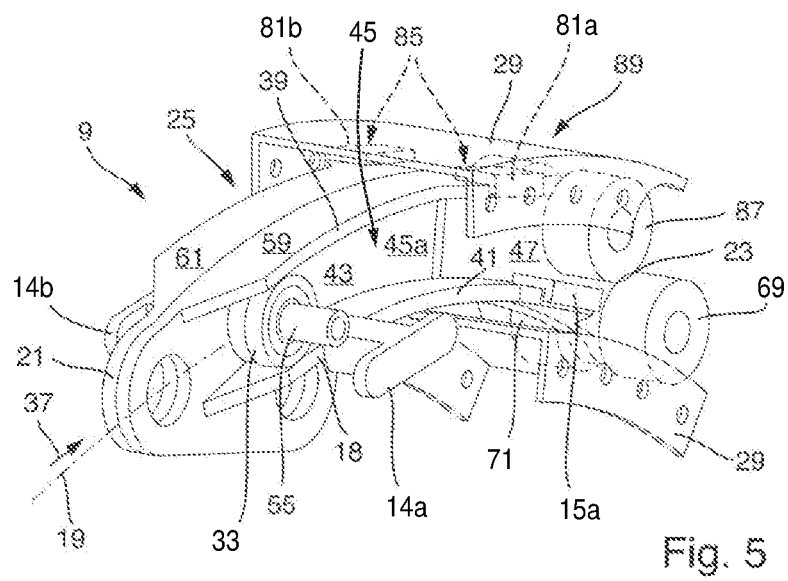
Figure 6:
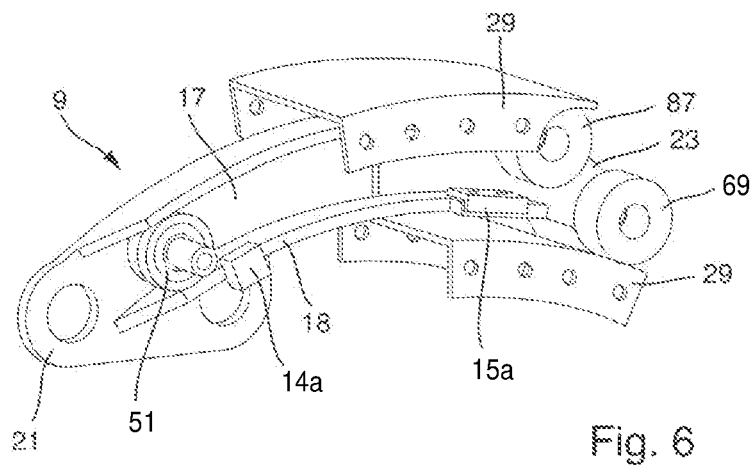
Figure 7:
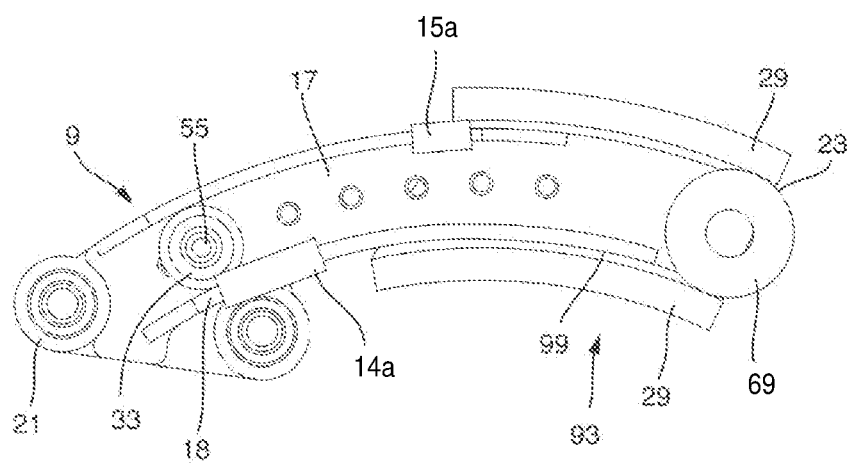
Figure 8:
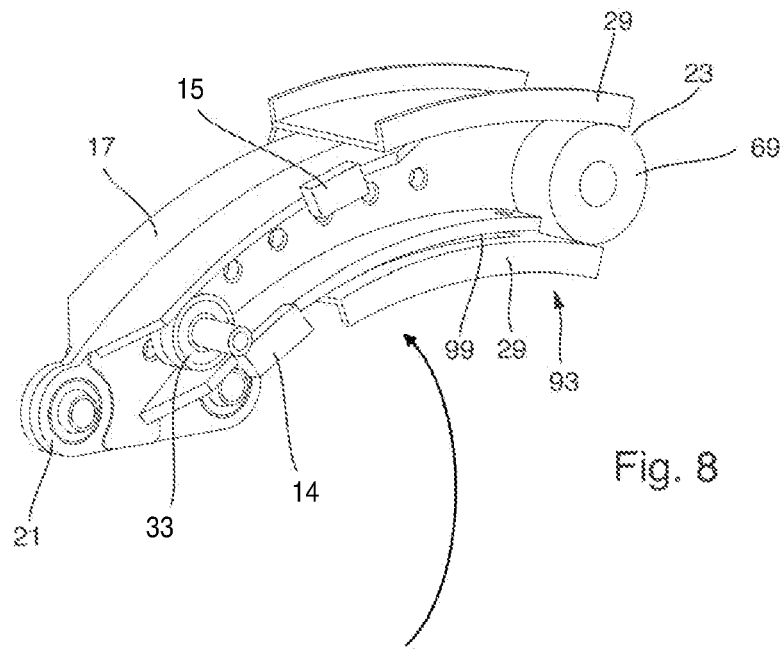
Figure 8:
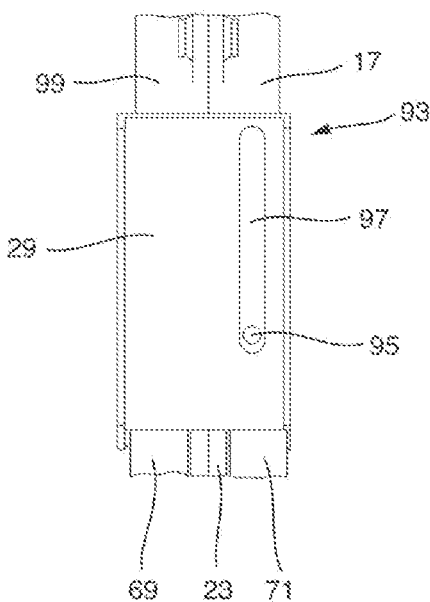

FIG. 2,

FIG. 4 a rear view of the connection assembly shown in FIG. 2,

FIG. 5 a perspective view of a second embodiment of a connection assembly as used in the wing shown in FIG. 1, FIG. 6 a perspective view of a third embodiment of a connection assembly as used in the wing shown in FIG. 1, FIG. 7 a side view of a fourth embodiment of a connection assembly as used in the wing shown in FIG. 1, and FIG. 8 a perspective and detailed view of the connection assembly shown in FIG. 7.

In FIG. 1 an aircraft 1 according to an embodiment of the present invention is illustrated. The aircraft 1 comprises a wing 3 that is formed according to an embodiment of the present invention. The wing 3 comprises a main wing 5, a slat 7, and a plurality of connection assemblies 9 movably connecting the slat 7 to the main wing 5, such that the slat 7 is movable between a retracted position and at least one extended position. Specifically, the connection assemblies shown in FIG. 1 include a first connection assembly 9a and a second connection assembly 9b connecting the slat 7 to the main wing 5 in a position spaced apart from the first connection assembly 9a in a wing span direction 11. The second connection assembly 9b is formed as the first connection assembly 9a.

Figure 3:
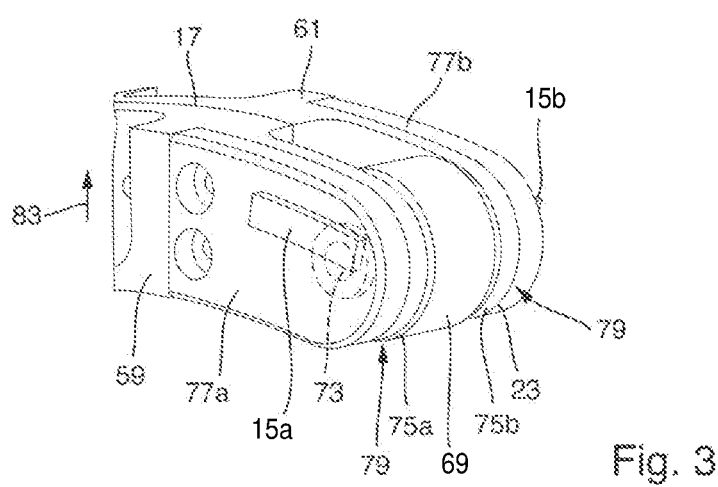

FIGS. 2 to 4 show a first embodiment of the connection assembly 9, comprising an elongate slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19. The roller bearing 27 comprises a guide rail 29 fixedly mounted to the main wing 5 and a first roller unit 31 fixedly mounted to the rear end 23 of the slat track 17 and engaging the guide rail 29. The roller bearing 27 comprises a second roller unit 33 that is fixedly mounted to the main wing 5 and that engages an engagement surface 35 provided at the intermediate portion 25 of the slat track 17.

The slat track 17 has a double-C-shaped profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

The double-C-shaped profile 37 of the slat track 17 provides that a first recess 45a is formed between the upper and lower flange portions 39, 41 at a first side 47 of the web portion 43, and a second recess 45b is formed between the upper and lower flange portions 39, 41 at a second side 49 of the web portion 43 opposite the first side 47. The second roller unit 33 comprises a first roller element 51 and a second roller element 53. The first roller element 51 is arranged in the first recess 45a and the second roller element 53 is arranged in the second recess 45b. First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are independently supported at the main wing 5.

The slat track 17 is supported in the wing span direction by a lateral support 12 restricting movement of the slat track 17 in the wing span direction 11 when the slat track 17 is moved along the track longitudinal axis 19. The lateral support 12 is formed as a slide bearing 13 comprising a first pair of slide pads 14 and a second pair of slide pads 15. Each pair of slide pads 14, 15 support the slat track 17 on opposite lateral sides 16a, 16b. The first pair of slide pads 14 is fixedly mounted to the main wing 5 and comprises a first inner slide pad 14a and a first outer slide pad 14b, wherein the first inner and outer slide pads 14a, 14b engage corresponding first slide surfaces 18 on opposite lateral sides 16a, 16b of the slat track 17, specifically on opposite lateral surfaces of the lower flange portion 41. The second pair of slide pads 15 comprises a second inner slide pad 15a and a second outer slide pad 15b that are fixedly mounted to opposite lateral sides 16a, 16b of the slat track 17 in a position spaced apart from the first pair of slide pads 14 along the track longitudinal axis 19 in such a manner that the second inner and outer slide pads 15a, 15b engage corresponding second slide surfaces 20 on opposite lateral sides of the guide rail 29 or of the main wing 5.

The slat track 17 comprises a first track part 59 and a second track part 61 that are formed separate from one another. Each of the first and second track parts 59, 61 is formed integrally and extends along the track longitudinal axis 19 from the rear end 23 to the front end 21. The first and second track parts 59, 61 are mounted to one another by bolts 63 and rest against one another along a contact plane 65 spanned by the track longitudinal axis 19 and a wing thickness direction 67.

The first roller unit 31 comprises a single third roller element 69 mounted to the slat track 17 by a yoke-shaped rear end 23 of the slat track 17 that holds the third roller element 69 from opposite lateral sides 16a, 16b. The third roller element 69 is supported by a shaft 73 that is rotatably mounted to a first yoke arm 75a at one side of the third roller element 69 and to a second yoke arm 75b at the opposite other side of the third roller element 69. The opposite lateral sides 16a, 16b of the first and second yoke arms 75a, 75b are covered by first and second cover parts 77a, 77b. The cover parts 77a, 77b protect the shaft 73 that projects through the yoke arms 75a, 75b. The second inner and outer slide pads 15a, 15b are mounted to the opposite lateral surfaces 16a, 16b of the cover parts 77a, 77b. Shim plates 79 of specific thickness are inserted between the first cover part 77a and the first yoke arm 75a and between the second cover part 77b and the second yoke arm 75b, to adjust the distance between the second pair of slide pads 15 and the second slide surface 20.

FIG. 5 shows a second embodiment of the connection assembly 9 that differs from the first embodiment by the following features: The second pair of slide pads 15 is mounted to opposite lateral surfaces of the lower flange portion 41. The slide bearing 13 comprises a third pair of slide pads 81 that comprises a third inner slide pad 81a and a third outer slide pad 81b that are mounted to opposite lateral sides 16a, 16b of the slat track 17, specifically to opposite lateral surfaces of the upper flange portion 39, in a position spaced apart from the second pair of slide pads 15 in a track thickness direction 83 in such a manner that the third pair of slide pads 81 engages corresponding third slide surfaces 85 on opposite lateral sides of the guide rail 29 or the main wing 5. Further, the first roller unit 31 instead of having a single third roller element 69, comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61. The first roller unit 31 also comprises a fifth roller element 87 and a sixth roller element 89. The fifth and sixth roller elements 87, 89 are arranged coaxially and have the same radius. The fifth and sixth roller elements 87, 89 are mounted to the slat track 17 parallel spaced apart from the third and fourth roller elements 69, 71, such that the third and fourth roller elements 69, 71 engage with the engagement surface 35 at the lower flange portion 41 and the fifth and sixth roller elements 87, 89 engage with the engagement surface 35 at the upper flange portion 39.

FIG. 6 shows a third embodiment of the connection assembly 9 that differs from the first embodiment merely by the first pair of slide pads 14 forming a stopper 91 that may be contacted by the second pair of slide pads 15 to limit movement of the slat track 17 along the track longitudinal axis 19.

FIGS. 7 and 8 show a fourth embodiment of the connection assembly 9 that differs from the second embodiment by the following features: The first roller unit 31 only comprises third and fourth roller elements 69, 71 but no fifths and sixths roller elements 87, 89. Further, the second pair of slide pads 15 is mounted to opposite lateral surfaces of the upper flange portion 39, and instead of a third pair of slide pads 81 a tongue and groove support 93 is provided, where a tongue 95 in the form of a pin runs in a linear groove 97 that is aligned with the track longitudinal axis 19 to limit movement of the slat track 17 in the wing span direction 11 and allow movement of the slat track 17 along the track longitudinal axis 19. The tongue 95 is provided on the slat track 17, extending downwards from a lower surface 99 of the slat track 17, and engages the groove 97 formed in the guide rail 29.

The invention claimed is:

1. An aircraft wing, comprising:
a main wing,
a slat, and
a connection assembly movable connecting the slat to the main wing, such that the slat is movable between a retracted position and at least one extended position,
wherein the connection assembly comprises an elongate slat track that extends along a track longitudinal axis between a front end and a rear end and has an intermediate portion between the front and rear ends,
wherein the front end of the slat track is mounted to the slat,
wherein the rear end and the intermediate portion of the slat track are mounted to the main wing by a roller bearing such that the slat track is movable along the track longitudinal axis,
wherein the roller bearing comprises a guide rail mounted to the main wing and a first roller unit mounted to the rear end of the slat track and engaging the guide rail, and
wherein the roller bearing comprises a second roller unit that is mounted to the main wing and that engages an engagement surface provided at the intermediate portion of the slat track,
wherein the slat track is supported in a wing span direction by a lateral support,
wherein the lateral support includes a slide bearing comprising at least a first pair of slide pads and a second pair of slide pads,
wherein the first pair of slide pads is mounted to the main wing and engages corresponding first slide surfaces on opposite lateral sides of the slat track, and
wherein the second pair of slide pads is mounted to opposite lateral sides of the slat track in a position spaced apart from the first pair of slide pads along the track longitudinal axis, such that the second pair of slide pads engages corresponding second slide surfaces on opposite lateral sides of the guide rail or the main wing.

2. The aircraft wing according to claim 1, wherein the slat track has a profile comprising an upper flange portion, a lower flange portion and at least one web portion connecting upper and lower flange portions.

3. The aircraft wing according to claim 2, wherein the first slide surface is provided on opposite lateral surfaces of the lower flange portion.

4. The aircraft wing according to claim 3, wherein the first pair of slide pads forms a stopper that is contacted by the second pair of slide pads or by a corresponding projection at the slat track to limit movement of the slat track along the track longitudinal axis.

5. The aircraft wing according to claim 2, wherein the second pair of slide pads is mounted to opposite lateral surfaces of the lower flange portion, to opposite lateral surfaces of the upper flange portion, to opposite lateral surfaces of the web portion, or to opposite lateral surfaces of cover parts of the rear end.

6. The aircraft wing according to claim 1, wherein the slide bearing comprises a third pair of slide pads that is mounted to opposite lateral sides of the slat track in a position spaced apart from the second pair of slide pads in a track thickness direction, such that the third pair of slide pads engages corresponding third slide surfaces on opposite lateral sides of the guide rail or the main wing.

7. The aircraft wing according to claim 6, wherein the third pair of slide pads is mounted to opposite lateral surfaces of the lower flange portion, to opposite lateral surfaces of the upper flange portion, to opposite lateral surfaces of the web portion, or to opposite lateral surfaces of cover parts of the rear end.

8. The aircraft wing according to claim 2, wherein the second roller unit is arranged in a recess between upper and lower flange portions and engages the engagement surface provided at the upper flange portion and/or at the lower flange portion,
wherein the slat track has such a profile that a first recess is formed between the upper and lower flange portions at a first side of the web portion, and a second recess is formed between the upper and lower flange portions at a second side of the web portion opposite the first side,
wherein the second roller unit comprises a first roller element and a second roller element,
wherein the first roller element is arranged in the first recess and the second roller element is arranged in the second recess, and
wherein first and second roller elements are arranged coaxially and have the same radius,
wherein the first roller element is mounted on a first shaft and the second roller element is mounted on a second shaft separate from the first shaft.

9. The aircraft wing according to claim 1, wherein the first roller unit comprises a single third roller element mounted to the slat track by a yoke-shaped rear end of the slat track that holds the third roller element from opposite lateral sides,
wherein the third roller element is supported by a shaft that is rotatably mounted to a first yoke arm at one side of the third roller element and to a second yoke arm at the opposite other side of the third roller element, and
wherein the opposite lateral sides of the first and second yoke arms are covered by the first and second cover parts, and
wherein the second pair of slide pads and/or the third pair of slide pads are mounted to the opposite lateral surfaces of the cover parts.

10. The aircraft wing according to claim 9, wherein shim plates of specific thickness are inserted between the first cover part and the first yoke arm and/or between the second cover part and the second yoke arm, to adjust the distance between the second pair of slide pads and the second slide surface and/or between the third pair of slide pads and the third slide surface.

11. The aircraft wing according to claim 1, wherein the first roller unit comprises a third roller element and a fourth roller element,
wherein third and fourth roller elements are arranged coaxially and have the same radius,
wherein the first roller unit comprises a fifth roller element and a sixth roller element,
wherein fifth and sixth roller elements are arranged coaxially and have the same radius, and
wherein the fifth and sixth roller elements are mounted to the slat track parallelly spaced apart from the third and fourth roller elements.

12. The aircraft wing according to claim 1, wherein the slat track comprises a first track part and a second track part that are formed separate from one another,
wherein each of the first and second track parts is formed integrally and extends along the track longitudinal axis from the rear end to the front end, and
wherein the first and second track parts are mounted to one another and rest against one another along a contact plane spanned by the track longitudinal axis and a wing thickness direction.

13. The aircraft wing according to claim 1, wherein the connection assembly is a first connection assembly, wherein the wing comprises a second connection assembly connecting the slat to the main wing in a position spaced apart from the first connection assembly in a wing span direction, and wherein the second connection assembly is formed as the first connection assembly.

14. An aircraft comprising a wing according to claim 1.

15. An aircraft connection assembly for movably connecting a slat to a main wing, comprising:
an elongate slat track that extends along a track longitudinal axis between a front end and a rear end and has an intermediate portion between the front and rear ends,
wherein the front end of the slat track is configured to be mounted to the slat,
wherein the rear end and the intermediate portion of the slat track are configured to be mounted to the main wing by a roller bearing such that the slat track is movable along the track longitudinal axis,
wherein the roller bearing comprises a guide rail configured to be mounted to the main wing, and a first roller unit mounted to the rear end of the slat track and configured for engaging the guide rail, and
wherein the roller bearing comprises a second roller unit that is configured to be mounted to the main wing and that is configured for engaging an engagement surface provided at the intermediate portion of the slat track,
wherein the slat track is configured to be supported in a wing span direction by a lateral support,
wherein the lateral support includes a slide bearing comprising at least a first pair of slide pads and a second pair of slide pads,
wherein the first pair of slide pads is configured to be mounted to the main wing and configured to engage corresponding first slide surfaces on opposite lateral sides of the slat track, and
wherein the second pair of slide pads is configured to be mounted to opposite lateral sides of the slat track in a position spaced apart from the first pair of slide pads along the track longitudinal axis, such that the second pair of slide pads is configured to engage corresponding second slide surfaces on opposite lateral sides of the guide rail or the main wing.

* * * * *